(12) United States Patent
Tanaka et al.

(10) Patent No.: US 7,185,143 B2
(45) Date of Patent: Feb. 27, 2007

(54) SAN/NAS INTEGRATED STORAGE SYSTEM

(75) Inventors: Atsushi Tanaka, Saitama (JP);
Akiyoshi Hashimoto, Kawasaki (JP);
Norio Hirako, Hadano (JP)

(73) Assignee: Hitachi, Ltd., Tokyo (JP)

(*) Notice: Subject to any disclaimer, the term of this patent is extended or adjusted under 35 U.S.C. 154(b) by 422 days.

(21) Appl. No.: 10/652,653

(22) Filed: Aug. 28, 2003

(65) Prior Publication Data
US 2004/0139168 A1 Jul. 15, 2004

(30) Foreign Application Priority Data
Jan. 14, 2003 (JP) ............................. 2003-005234

(51) Int. Cl.
*G06F 13/12* (2006.01)
(52) U.S. Cl. .................. 711/114; 710/22; 710/305; 710/308; 710/100; 710/74; 709/245; 365/63; 365/230.03; 711/112; 711/113
(58) Field of Classification Search ........... 365/230.03, 365/63; 709/245, 1; 710/74, 305, 22, 308, 710/100; 711/114, 112, 113; 707/1
See application file for complete search history.

(56) References Cited

U.S. PATENT DOCUMENTS

| 4,200,930 | A | * | 4/1980 | Rawlings et al. ........... 709/212 |
| 5,287,519 | A | * | 2/1994 | Dayan et al. ................ 713/202 |
| 5,727,218 | A | * | 3/1998 | Hotchkin .................... 710/260 |
| 5,809,543 | A | * | 9/1998 | Byers et al. ................. 711/162 |
| 5,987,621 | A | * | 11/1999 | Duso et al. ...................... 714/4 |
| 6,009,463 | A | * | 12/1999 | Brandt et al. ................ 709/213 |
| 6,009,478 | A | * | 12/1999 | Panner et al. ................... 710/5 |
| 6,101,533 | A | * | 8/2000 | Brandt et al. ................ 709/213 |
| 6,301,605 | B1 | * | 10/2001 | Napolitano et al. ......... 709/201 |
| 6,353,599 | B1 | * | 3/2002 | Bi et al. ....................... 370/328 |

(Continued)

FOREIGN PATENT DOCUMENTS

JP  A-2000-99281  3/2000

(Continued)

OTHER PUBLICATIONS

"Storage Management, NAS, IP SAN and Gateway," product information NeuStream, Inc. Minneapolis, MN (Aug. 2004).

(Continued)

*Primary Examiner*—Viet Q. Nguyen
(74) *Attorney, Agent, or Firm*—Townsend and Townsend and Crew LLP

(57) ABSTRACT

In a storage system directly connected to a network, if conventional interfaces and protocols are used when an I/O command issued from a file server is transmitted to the storage system, the command/data is serially transferred via a single transfer path so that the performance is lowered. Conventional interfaces do not provide the means to notify the storage system of the failure at the file server. The file server and a channel adapter of the storage system are mounted on the same board and connection paths therebetween are controlled so that a plurality of protocols can be operated independently. A path independent from a command/data path is provided between the file server and channel adapter, and the received failure information is stored in a shared memory of the storage system and used for the fail-over.

8 Claims, 9 Drawing Sheets

U.S. PATENT DOCUMENTS

| | | | |
|---|---|---|---|
| 6,606,690 B2 | 8/2003 | Padovano | |
| 6,625,750 B1 * | 9/2003 | Duso et al. | 714/11 |
| 6,658,504 B1 | 12/2003 | Lieber et al. | |
| 6,779,063 B2 * | 8/2004 | Yamamoto | 710/74 |
| 6,807,581 B1 * | 10/2004 | Starr et al. | 709/250 |
| 2002/0083120 A1 | 6/2002 | Soltis | |
| 2002/0087720 A1 * | 7/2002 | Davis et al. | 709/238 |
| 2002/0091844 A1 * | 7/2002 | Craft et al. | 709/230 |
| 2002/0116539 A1 | 8/2002 | Krzysztof et al. | |
| 2002/0129216 A1 | 9/2002 | Collins | |
| 2002/0152339 A1 | 10/2002 | Yamamoto | |
| 2002/0161982 A1 | 10/2002 | Riedel | |
| 2002/0163910 A1 * | 11/2002 | Wisner et al. | 370/389 |
| 2002/0178143 A1 | 11/2002 | Fujimoto | |
| 2003/0023665 A1 | 1/2003 | Matsunami et al. | |
| 2003/0023784 A1 | 1/2003 | Matsunami et al. | |
| 2003/0037061 A1 | 2/2003 | Sastri et al. | |
| 2003/0084242 A1 | 5/2003 | Strange et al. | |
| 2003/0105767 A1 | 6/2003 | Sonoda et al. | |
| 2003/0135782 A1 | 7/2003 | Matsunami et al. | |
| 2003/0204671 A1 | 10/2003 | Matsunami et al. | |
| 2003/0225735 A1 * | 12/2003 | Weber | 707/1 |
| 2003/0236884 A1 | 12/2003 | Yamamoto et al. | |
| 2004/0010680 A1 * | 1/2004 | Smith et al. | 713/1 |
| 2004/0083401 A1 | 4/2004 | Furukawa et al. | |
| 2004/0128456 A1 | 7/2004 | Kobayashi et al. | |
| 2004/0133718 A1 * | 7/2004 | Kodama et al. | 710/74 |
| 2004/0193760 A1 * | 9/2004 | Matsunami et al. | 710/36 |
| 2005/0076263 A1 * | 4/2005 | Tomita | 714/6 |
| 2005/0086558 A1 * | 4/2005 | Tomita | 714/6 |
| 2005/0119994 A1 * | 6/2005 | Matsunami et al. | 707/1 |
| 2005/0210191 A1 * | 9/2005 | Kobayashi et al. | 711/114 |

FOREIGN PATENT DOCUMENTS

| | | |
|---|---|---|
| JP | A-2002-14878 | 1/2002 |

OTHER PUBLICATIONS

"Server, NAS/SAN/DAS, and RAID Array Data Recovery Capabilities," product information IomegaCorporation San Diego, CA (2004).

"Comparing Storage Area Networks and Network Attached Storage," product information Brocade Communications Systems, Inc. San Jose, CA (2001).

* cited by examiner

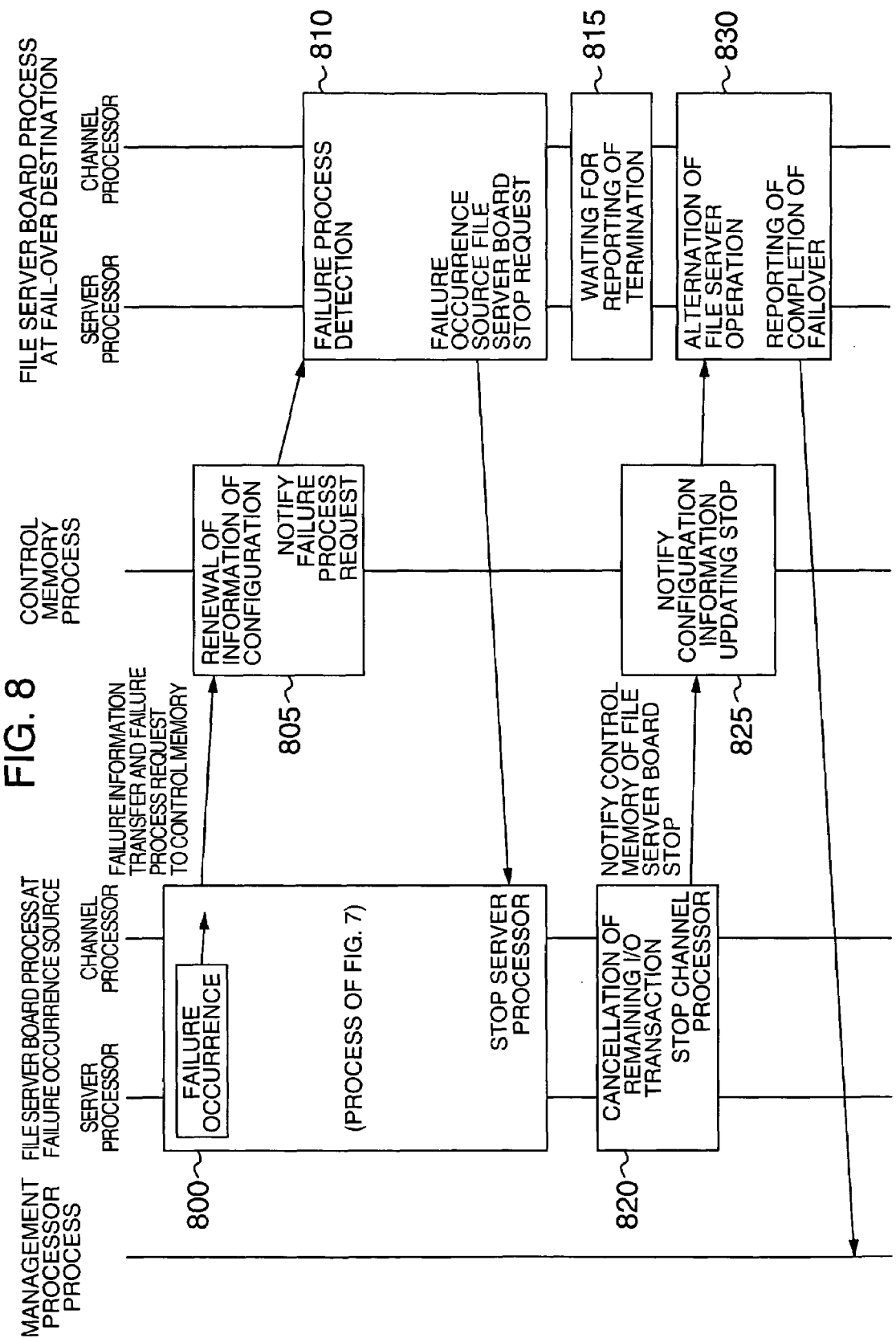

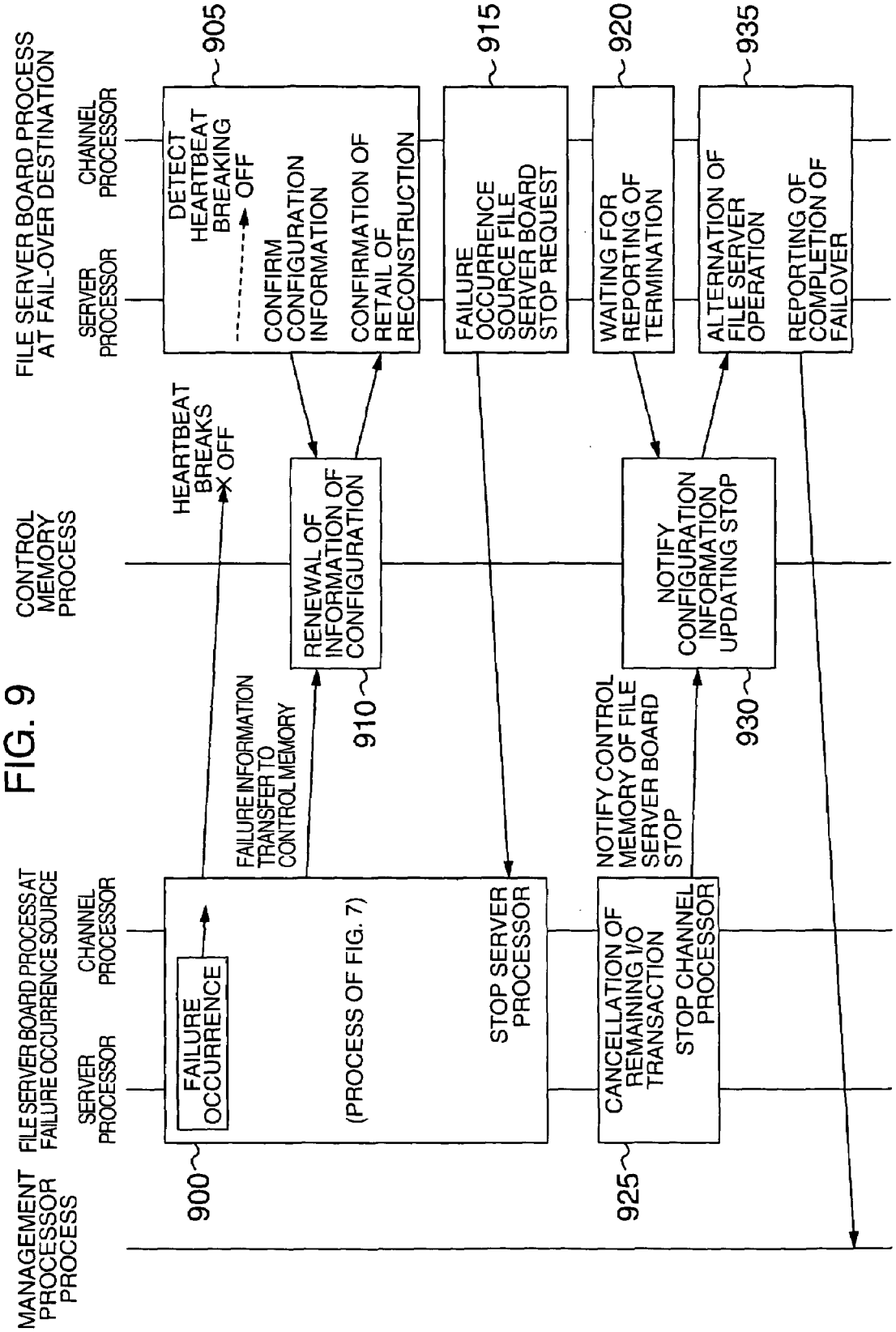

SAN/NAS INTEGRATED STORAGE SYSTEM

BACKGROUND OF THE INVENTION

The present invention relates to a system integrating a file system and a storage system and its management method, and more particularly to techniques of processing an I/O command from a file system at high speed and performing a failure process at high speed.

A storage system is known which is used by connecting it to a host computer, as disclosed in JP-A-2000-99281. In order to speed up data transfer and data control in the storage system, a channel adapter to be connected to the host computer, a disk adapter to be connected to disks, a disk cache and a control memory are interconnected by a network.

As disclosed, for example, in U.S. Appl. No. 2002/0116593, in order to allow a user having only an Ethernet (registered trademark) port to connect to a storage system, a file server in the storage system and a host computer are connected by Ethernet and the file server and a channel adapter are connected by a block interface at a Fibre Channel port.

A communication system between a server and a storage system via a private network using, for example, the Fibre Channel protocol, is generally called a Storage Area Network (SAN) system. A communication system with direct LAN connection via, for example, Ethernet using a protocol such as a TCP/IP protocol and a protocol in conformity with the standard such as "Ethernet II", "IEEE802.3" and "IEEE802.2", is generally called a Network Area Storage (NAS) system.

As disclosed, for example, in JP-A-2002-14878, a computer system is known which has a path for sending failure information directly from a file server to a storage system.

SUMMARY OF THE INVENTION

It is an issue of the invention to provide a new system integrating SAN and NAS systems.

FIG. 3 is a diagram showing the structure of a new system as a comparison example of the present invention. This system is a SAN/NAS integrated storage system which integrates a file system and a storage system via a network.

For data access by a user or an application, it is generally necessary to prepare a host computer 300, a file server 310 and a storage system 340, as shown in FIG. 3. The user or application exists on the side of the host computer 300 and issues a data access request via a network or Ethernet port 305 to the file server 310 which manages files. The file server 310 manages data (files) to be used by the user or application, and issues a data (blocks) read/write request to a disk 160, 161. At this time, the file server 310 converts file information into block information. In response to a command from the file server 310, data is stored in or read from the disk 160, 161.

Collecting hardware of the storage system 340 is being progressed so as to meet the requirements of an increase in the capacity of the disk 160, 161, an improvement on the interface performance and processor performance, and an increase in a mount density of LSI's and boards. As the hardware is collected, the number of channel adapters and the number of disks increase so that it is effective to adopt the configuration that channel adapters 110 and 310, disk adapters 140 and 141, a disk cache 132 and a control memory 131 are all connected by a network 130 in order to speed up data transfer and data control in the storage system. This storage system having such a network is disclosed in the above-described JP-A-2000-99281.

Collecting data of a plurality of users in the storage system 340 is being progressed so as to meet the requirements of reduction in a management cost. However, not all users have a block interface, typically Fibre Channel, but many users have only an IP interface, typically Ethernet. In addition, there arises a problem of an increased cost if Fibre Channel is used for the connection to the storage system 340 from a remote site. When user data is collected in the storage system 340, there occurs a high demand for the storage system 340 which, as shown in FIG. 3, has the file server 310 connected to the channel adapter 330 via a block interface such as the Fibre Channel port 320 in order to allow access by a user having only an IP interface such as an Ethernet port 305.

A NAS system having such an IP interface is disclosed, for example, in U.S. Appl. No. 2002/0116593. A storage system disclosed in this U.S. Appl. has a file server which controls an IP interface for a user and is connected to the storage system by Fibre Channel via a mutual switch. With this method, a file server process and a storage process are executed separately so that a system performance can be improved.

As the scale of a storage system becomes large and a NAS system is becomes usual, a failure process is required to be cooperatively performed between the file server 310 and storage system 340 in order to maintain a high reliability of the whole system. If information on a failure particularly on the side of the file server 310 is not transmitted directly to the storage system 340, it takes time to disconnect a failed unit and fail over to another unit. Both the reliability and performance are therefore be lowered. To avoid this, a method has been studied in which failure information is transmitted via a path different from a path via which usual data is transferred. Such a computer system having a path via which failure information is transmitted directly from a file server to a storage system, is disclosed, for example, in JP-A-2002-14878. The computer system disclosed in this Publication sends failure information to a storage system via another path without using a host bus to be controlled by a processor on the side of a file server. With this method, a failure on the file server side can be informed directly irrespective of the processor status so that the system can be maintained highly reliably.

The storage system disclosed in the above-described JP-A-2000-99281 does not have an IP interface to the host computer. A user without a file server cannot connect the storage system. It is therefore necessary to prepare a new file server to connect the storage system. Although the comparison example shown in FIG. 3 has the file server 310 newly prepared, it is associated with the problem of an increase in a management cost and an installation area.

A NAS system disclosed in U.S. Appl. No. 2002/0116593 has NAS so that a file system and the storage system are coupled together. However, only one Fibre Channel cable is used for a connection path to be used for transferring data or a command once. There is a high possibility that the performance is lowered if a load is heavy. Since only one Fibre Channel cable is used, failure information of a file server cannot be sent to the storage system. There is therefore a high possibility that it takes a long time to complete a fail-over. This NAS system is therefore associated with a problem of a lowered performance and a lowered reliability.

A computer system disclosed in JP-A-2002-14878 regarding a failure process can transmit failure information of a filer server (described as a main processor in this Publication) directly to a disk control device (described as an I/O processor in this Publication). However, actual use of the failure information in the failure process is only after setting information of the file server is altered and the failure information is notified to an external management server via an IP network. Therefore, if a load of the IP network is heavy or there are some other reasons, the partner cannot acquire the failure information reliably or it takes time to transmit the failure information.

It is an object of the present invention to solve the above-described problems and provide a storage system and method wherein the storage system has an interface of a file server.

It is another object of the present invention to provide a storage system and method wherein a command and data are processed in parallel between a file server and the storage system.

It is another object of the present invention to provide a storage system and method wherein failure information of a filer server is transferred via a path different from a path used for normal command and data and the failure information is shared by the whole storage system.

It is still another object of the present invention to provide a storage system and method wherein a fail-over of a file server with a failure is performed by using the failure information shared by the storage system.

In order to solve the above problems, the storage system according to one aspect of the invention comprises: a disk for storing data; a first adapter directly connected to a first network connected to a first host computer; a second adapter directly connected to the disk; and a second network directly connected to the first and second adapters for inter-connecting the first and second adapters, wherein the first adapter converts information in conformity with a first protocol received from the first host computer via the first network into information in conformity with a second protocol, and transferring the converted information to the second adapter via the second network. According to the invention, the host computer and adapter are connected by a high speed interface not performing redundant protocol conversion, by using an internal bus such as a PCI interface. According to the invention, a file server and a channel adapter of the storage system are disposed on the same substrate to form the first adapter, and the file server and channel adapter are connected by a high speed interface.

The first protocol is a so-called Ethernet protocol in conformity with a standard of, for example, "Ethernet II", "IEEE802.3" or "IEEE802.2" so that various types of host computers can be connected. The second protocol is, for example, Fibre Channel realizing a dedicated high speed channel. Both the protocols can be coupled by using only the first adapter. An excellent space factor and excellent maintenance are therefore possible.

The file server unit comprises: a server processor for controlling said file server unit; a LAN controller for controlling the command and the data incoming from said first network; and a first internal bus for interconnecting said server processor and said LAN controller. For example, the server processor executes a conversion process of the command and data and sends them to the channel adapter unit by using the second protocol. The channel adapter unit sends the converted command and data to the second network.

Since the file server unit and channel adapter unit are integrally formed, it is easy to physically or logically independently form a network data path for transmission/reception of the data and a control data path for transmission/reception of the command between the file server unit and channel adapter unit. Namely, a plurality of independent paths are formed between the file server and the storage system so that the command and data can be processed by using different paths during the I/O process.

The file server unit may comprise a host controller disposed between the server processor and the first internal bus for controlling transmission/reception of the command and the data and for controlling failure information. The channel adapter unit may comprise a channel processor for controlling the channel adapter. It is desired to form a management bus between the file server unit and the channel adapter unit, for transmission/reception of failure information without involving the first internal bus. The management bus directly connects the server processor or host controller to the control data controller in the channel adapter unit. Even if the first internal bus cannot be used due to a failure, failure information of the server processor or host controller can be transferred to the channel adapter unit. In this manner, the failure process information of the file server can be transferred to the storage system by using a path different from a path used for the I/O process. The failure process information is stored in a memory to allow the storage system to share it, and another storage system or another file server can refer to it when a fail-over is performed.

According to another aspect of the invention, a disk control system or novel first adapter described above for transmitting and receiving a command and data to and from a host computer by utilizing an external protocol having a standard of at least one of "Ethernet II", "IEEE802.3" and "IEEE802.2" and accessing a recording disk by utilizing an internal protocol other than the external protocol, comprises: a file server unit and a channel adapter unit mounted on a single board or in a single housing.

The file server unit comprises: a server processor for controlling said file server unit and converting the command and the data from the external protocol into the internal protocol; a LAN controller for performing a communication control of the command and the data by using the external protocol; a first internal bus for interconnecting the server processor and the LAN controller; and a host controller disposed between the server processor and the first internal bus for controlling transmission/reception of the command and the data and for controlling failure information.

The channel adapter unit comprises: a network data controller for controlling transmission/reception of the data to and from the recording disk; a control data controller for controlling transmission/reception of the command to and from the recording disk; a channel processor for controlling the channel adapter unit; and a second internal bus for interconnecting the network data controller and the control data controller. The disk control system further comprises: a network data path connected between the first and second internal busses for transmission/reception of the data in accordance with the internal protocol; and a control data path for transmission/reception of the command in accordance with the internal protocol, respectively provided physically or logically independently between the file server unit and the channel adapter unit, and a management bus for transmission/reception of the failure information without involving the first and second internal busses.

A storage system according to another aspect of the invention comprises: a plurality of disks for storing data; a plurality of controllers for receiving an I/O command from a host computer and controlling the disks in accordance with the I/O command; and a network for interconnecting the plurality of controllers, wherein: one of the plurality of controllers has a block interface as an interface to the host computer; and another of the plurality of controllers has a file interface as an interface to the host computer. The file interface (file system interface) is an interface for transmission/reception of data based upon a file name. The block interface (block device interface) is an interface, typically SCSI, for transmission/reception of data based upon a device identifier, a start block address, the number of blocks and the like. Data is accessed by designating a block address in a disk representative of a block location. The storage system is provided which integrates interfaces using different protocols.

Other objects, features and advantages of the invention will become apparent from the following description of the embodiments of the invention taken in conjunction with the accompanying drawings.

BRIEF DESCRIPTION OF THE DRAWINGS

FIG. 8 is a flow chart illustrating a fail-over operation to be performed when a failure occurs in a server processor according to the first embodiment.

FIG. 9 is a flow chart illustrating a fail-over operation to be performed when a failure occurs in a server processor according to a second embodiment.

DESCRIPTION OF THE EMBODIMENTS

An embodiment of the invention will be described with reference to FIG. 1.

Figure 1:
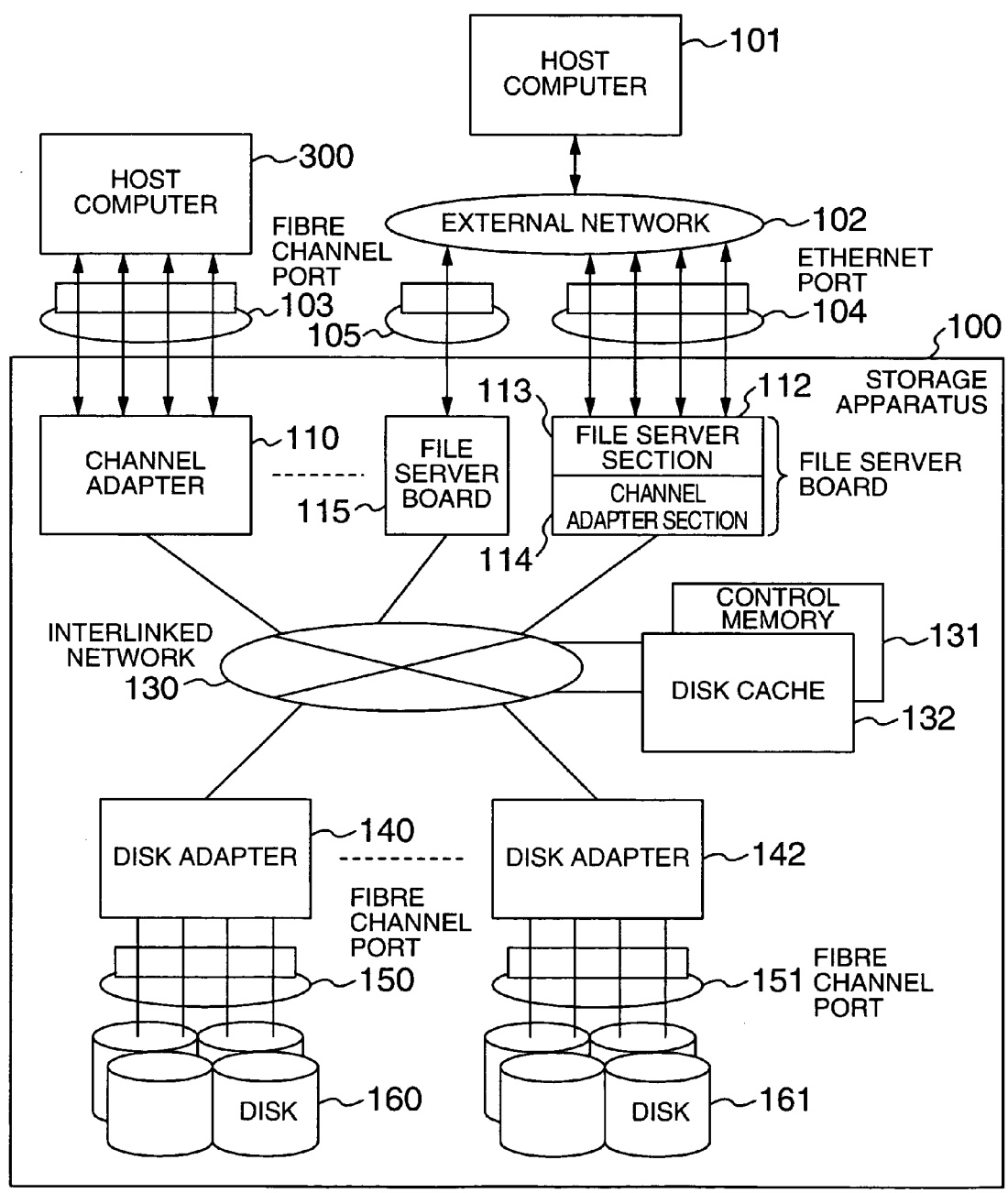
FIG. 1 is a diagram showing the configuration of a SAN/NAS integrated storage system according to the invention.

FIG. 1 is a diagram showing the structure of a system according to a first embodiment of the invention.

Figure 3:
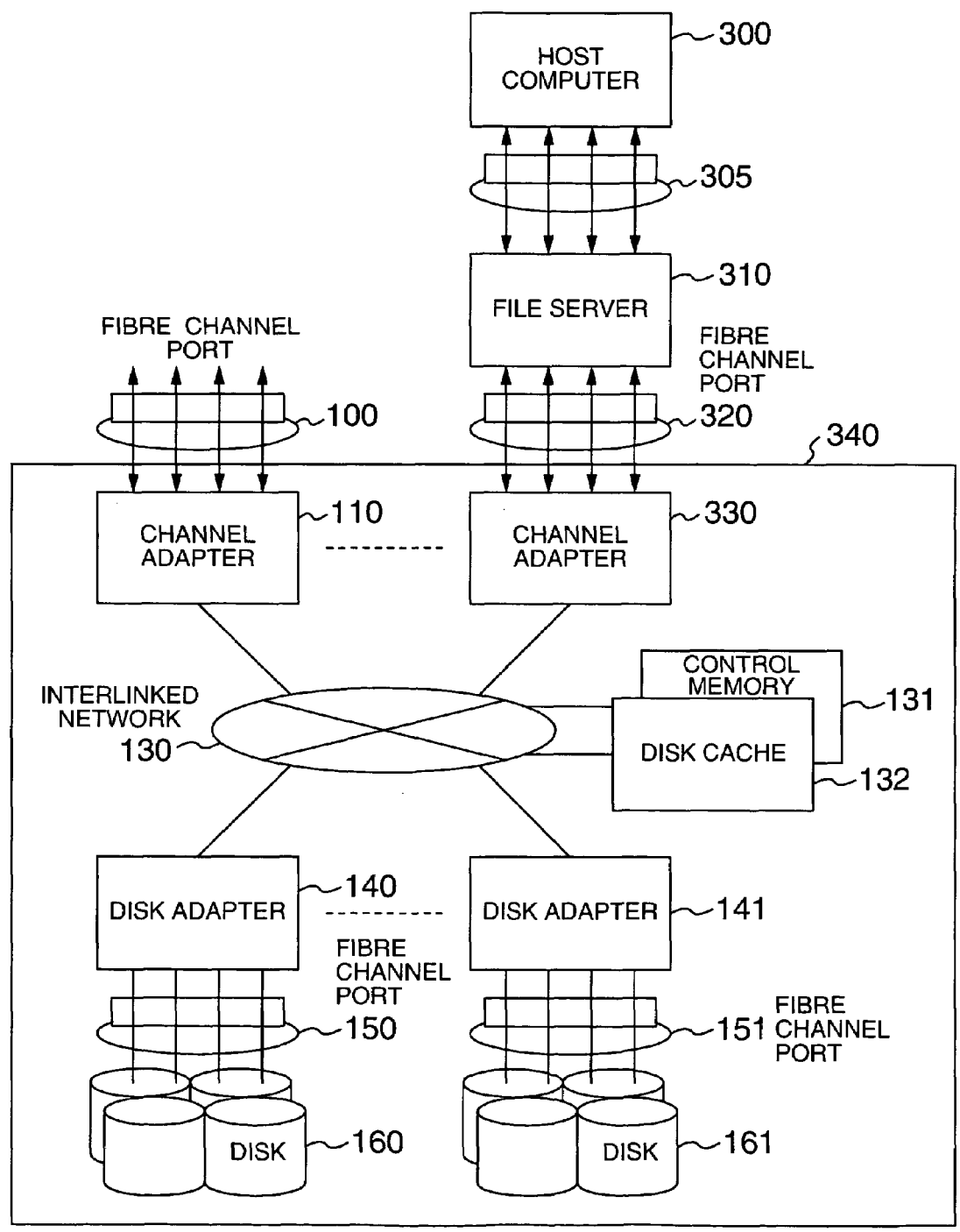
FIG. 3 is a diagram showing the structure of a comparison example of the SAN/NAS integrated storage system.

Referring to FIG. 1, reference numeral 100 represents a storage system for storing data to be used by a user or an application. The storage system 100 of the invention has interfaces compatible with host computers 101 and 300. The host computer 300 is connected via a Fibre Channel interface 103 having a plurality of Fibre Channel ports. The host computer 101 having an IP interface is connected via an Ethernet interface 104, 105 having a plurality of Ethernet ports. The storage system 100 has: a channel adapter 110 connected to the Fibre Channel interface 103 of the host computer 300 and performing a command and data process; and a file server board 112, 115 connected to the Ethernet interface 104, 105 of the host computer 101 via an external network 102 and processing a command and data including a file. The file server board 112, 115 has its own OS and is constituted of a file server unit 113 and a channel adapter unit 114. The file server unit 113 performs an IP protocol process from the host computer 101 and converts a file level request into a block level request. The channel adapter unit 114 processes the block level request. The file server unit 113 and channel adapter unit 114 are disposed on the same board and connected by a plurality of high speed interfaces as will be later described. The storage system 100 also has a disk cache 132 and a control memory 133. The disk cache 132 is used for temporarily storing data and speeding up data read/write. The control memory 133 is used for maintaining the integrity of data in the storage system and storing and sharing the system status. The storage system 100 has also a disk adapter 140, 142 for controlling a disk 160, 161 which stores data. The channel adapter 110, file server board 112, disk cache 132, control memory 133 and disk adapters 140 and 142 each have an interface to a network 130 to be interconnected with each other. The network 130 is constituted of switches and the like and has a higher speed and a higher reliability than those of the external network 102. Since the storage system constructed as above has a plurality of interfaces, an additional file serve such as shown in FIG. 3 is not necessary so that the system cost can be lowered. Next, the details of the file server board 112, 115 will be given.

Figure 2:
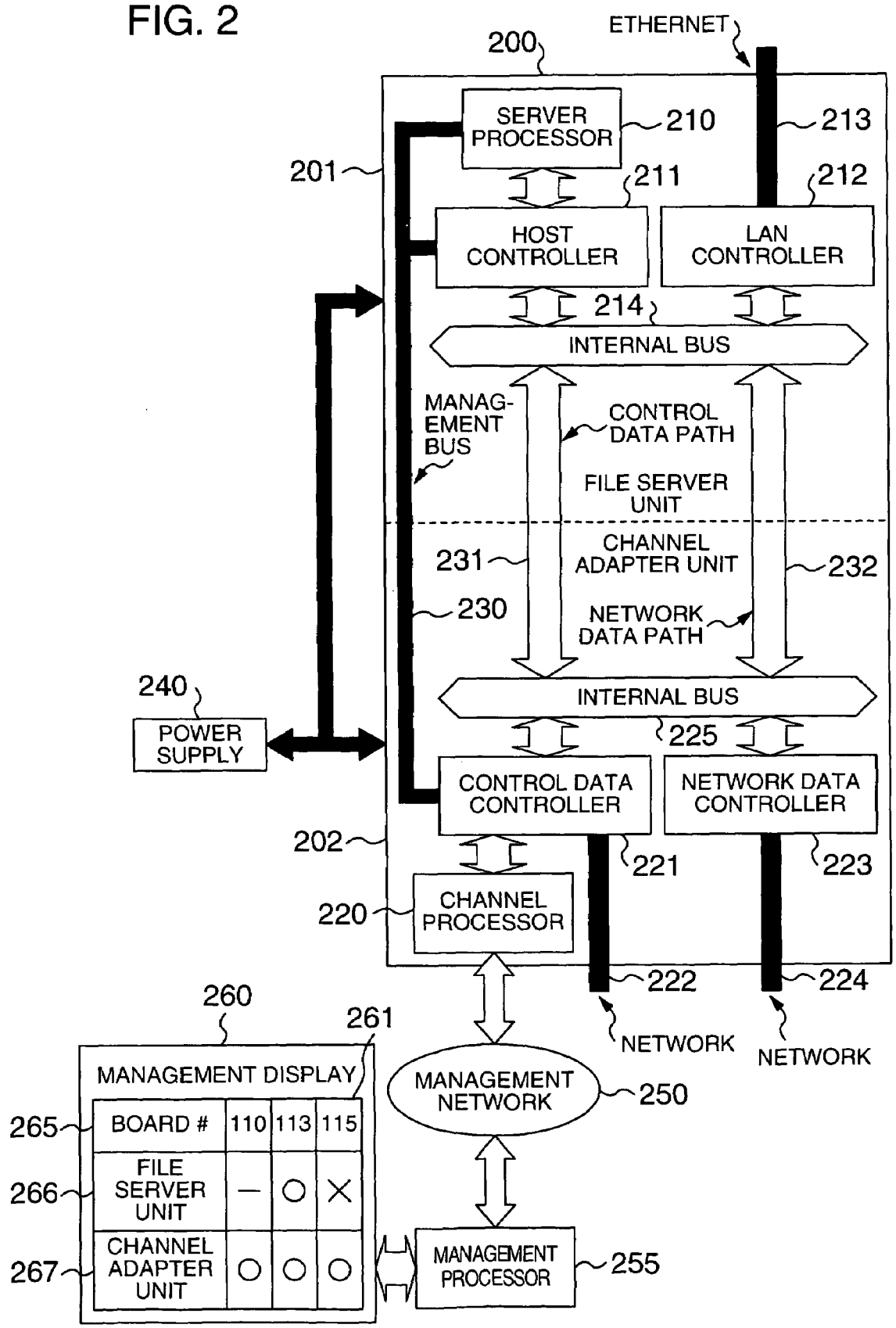
FIG. 2 is a diagram showing the structure of a file server board integrating a file server unit and a channel adapter unit according to the invention.

FIG. 2 is a diagram showing the structure of the file server board integrating the file server unit and channel adapter unit of the invention.

Referring to FIG. 2, reference numeral 200 represents the file server board 112, 115 which transmits and receives a command and data at a file level to and from the host computer via the external network 102, and transmits and receives a command and data at a block level to and from the disk cache 132, control memory 133 and disk adapters 140 and 142 via the network 130. In FIG. 2, although only one interface to the external network 102 and network 130 is shown for the purposes of description simplicity, a plurality of interfaces may also be used, which obviously falls in the scope of the present invention. Reference numeral 201 represents a file server unit which receives a command and data from the external network 102, performs an intra file system process, and converts a command and data at the file level into a command and data at the block level which in turn sent to a channel adapter unit 202. A server processor 210 controls the entirety of the file server unit 201. A host controller 211 controls the server processor 210 and peripheral memories, transmission/reception of a command and data and an interrupt signal to and from an internal bus 214, and failure information. A LAN controller 212 controls a command and data incoming from the external network 102. An Ethernet cable 213 interconnects the external network 102 and file server board 200 for transmission/reception of a command and data in conformity with the IP protocol. The internal bus 214 interconnects the host controller 211, LAN controller 212 and channel adapter unit 202 for transmission/reception of a command and data. In addition to the internal bus 214, the file server board has a management bus 230 which is an independent path to be used by a server processor 210 and a host controller 211 for transmission/reception of failure information. The management bus 230 is connected to a control data controller 221 in the channel adapter unit 202. Therefore, even if the internal bus 214 cannot be used because of a failure, failure information of the server processor 210 and host controller 211 can be transferred to the channel adapter unit 202. The channel adapter unit 202 receives a command and data at the block level sent from the file server unit 201, and transmits them via the network 130 to the proper disk cache 132, control memory 133 and disk adapter 140, 142 in accordance with the contents of the received command and data. A channel processor 220 controls the entirety of the channel adapter unit 202. The control data controller 221 controls transmission/reception of data necessary for controlling the entirety of the storage system 100 and transmission/reception of failure information supplied from the server processor 210 and host controller 211. Reference numeral 222 represents the network 130 for the control memory 133 which network transfers control data supplied from the control data controller to the control memory 131, disk adapters 140 and 142 and another channel adapter 110 and another file server board 113. Reference numeral 223 represents a network data controller which controls transmission/reception of data of a user or an application. Reference numeral 224 represents the network 130 which transfers the user or application data and transfers data supplied from the network data controller 223 to the disk cache 132 and disk adapters 140 and 142. A control data path 231 is used for transmitting and receiving a command and the information necessary for controlling the entirety of the storage system 100, to and from the file server unit 201 and channel adapter unit 202. A network data path 232 is used for transmitting and user or application data and the parameters and the like necessary for the data transfer, to and from the file server unit 201 and channel adapter unit 202. A management network 250 is used for transferring failure information and configuration information collected by the channel processor 220 to a management processor 255. The management processor 255 judges from the received information whether the received information indicates performing a failure process, a configuration change or the like, and when necessary, instructs the storage system 100 to perform some operation. The management processor 255 can collectively display the information of each board on a management display 260. For example, a management table 261 can be displayed. The statuses of a file server unit 266 and a channel adapter unit 267 at each board # 265 can be displayed. A power source 240 is connected to a file server board 200 and supplies power to the filer server unit 201 and channel adapter unit 202. With the structure described above, it is possible to collectively mount the file server and the interface to the storage system on the same board. The mount area of the system can therefore be reduced. It is also possible to manage file servers and the storage system by using the same management processor 255 and management display 260. A management cost can therefore be reduced. Two independent paths, the control data path 231 and network data path 232, are provided for the command/data transfer between the file server unit 201 and channel adapter unit 202. It is therefore possible to separately process relatively short data such as commands and parameters and relatively long data such as user and application data. The data transfer performance can therefore be improved. Commands and the like can be collectively transferred so that the process efficiency can be improved. The standard specification of a command format can be altered by separating commands from data. Device specific information and parameters can therefore be sent directly to the channel adapter, and stay-and-resident data in the disk cache 132 can be selected. The two independent paths may be realized either by physically separated two paths or by one physical path having two logical paths, which obviously falls in the scope of the present invention. One physical path having two logical paths can be realized by the hardware structure of the file server board 112 to be described hereinafter. In the example shown in FIG. 2, two processors, the server processor 210 and channel processor 220, are mounted on the file server board 112. Only the server processor 210 may be used to control all the components on the file server board 112, which obviously falls in the scope of the present invention.

Figure 4:
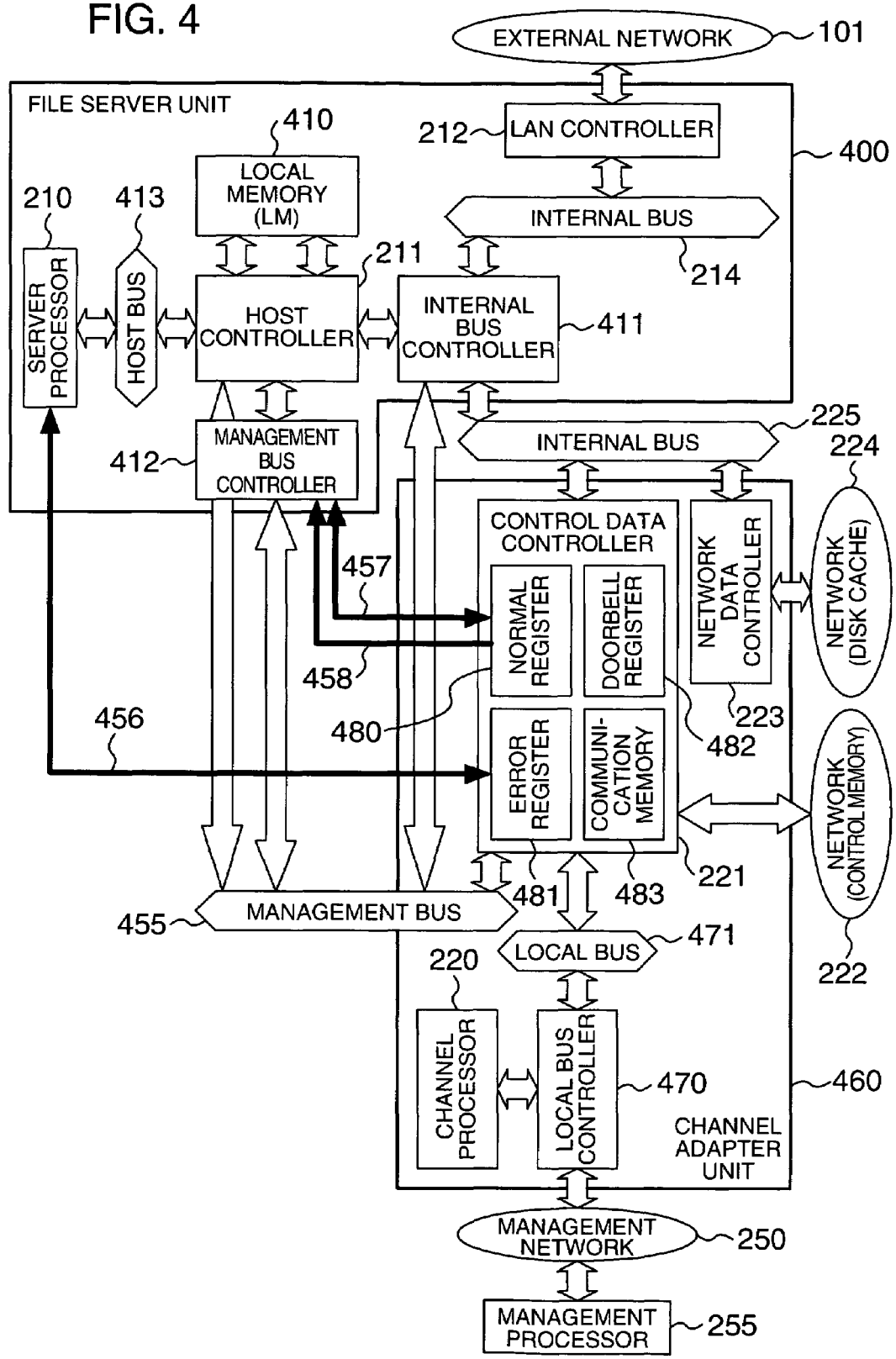
FIG. 4 is a diagram showing the hardware structure of a file server board according to a first embodiment of the invention.

FIG. 4 shows the hardware structure of the file server board according to the first embodiment of the invention.

Referring to FIG. 4, the server processor 210 and host controller 211 in a file server unit 400 are interconnected by a host bus 413. Connected to the host controller 211 are a management bus controller 412 for controlling a management bus 455, a local memory 410 for storing programs, data and the like to be used by the server processor 210 and an internal bus controller 411 for controlling the interconnection between internal busses 214 and 225. The internal bus controller 411 controls a path interconnecting the file server unit 400 and a channel adapter unit 460, and controls the internal busses 214 and 225 as if there are a plurality of logical paths. Namely, the control data path 231 and network data path 232 shown in FIG. 3 can be configured logically. The channel processor 220 in the channel adapter unit 460 is connected to a local bus 471 via a local bus controller 470. Although omitted in FIG. 4, a memory and the like necessary for the channel processor 220 are connected to the local bus. The local bus controller 470 is connected to the management network 250 to transmit necessary management information and the like to the management processor 255. The control data controller 221 is connected to the local bus 471. The control data controller 221 is connected to the local bus 471. The control data controller 221 is connected to the internal bus 225 to perform usual control data transfer. The control data controller is connected to the control memory 131 and another channel processor via a network 222 to transfer control information and shared information. Interrupt signals 456 and 457 are directly input from the server processor 210 and management bus controller 412 to the control data controller 221. The management bus 455 is also connected to the control data controller in order to acquire the information of the server processor even if the internal buses 214 and 225 cannot operate due to a failure. The control data controller 221 has a general register 480 to be used for a general control, an error register 481 for storing error information, a door bell register 482 to be used for the control of communication with the file server unit 400, and a communication memory 483. In addition to the control data controller 221, the network data controller 223 is connected to the internal bus 225 in order to transfer user and application data. In order for the channel processor 220 to control the start, stop, restart of the file server unit 400, the control data controller 221 and management bus controller 412 are interconnected by a power source control means 458. In this embodiment, it is assumed that the power source of the file server unit can be controlled by the power source control means 458. The structure shown in FIG. 4 is only illustrative and it is obvious that other structures fall in the scope of the present invention. Next, description will be made on examples of the format of commands to be transferred via the control data path 231 in the file server board 200 described above.

Figure 5:
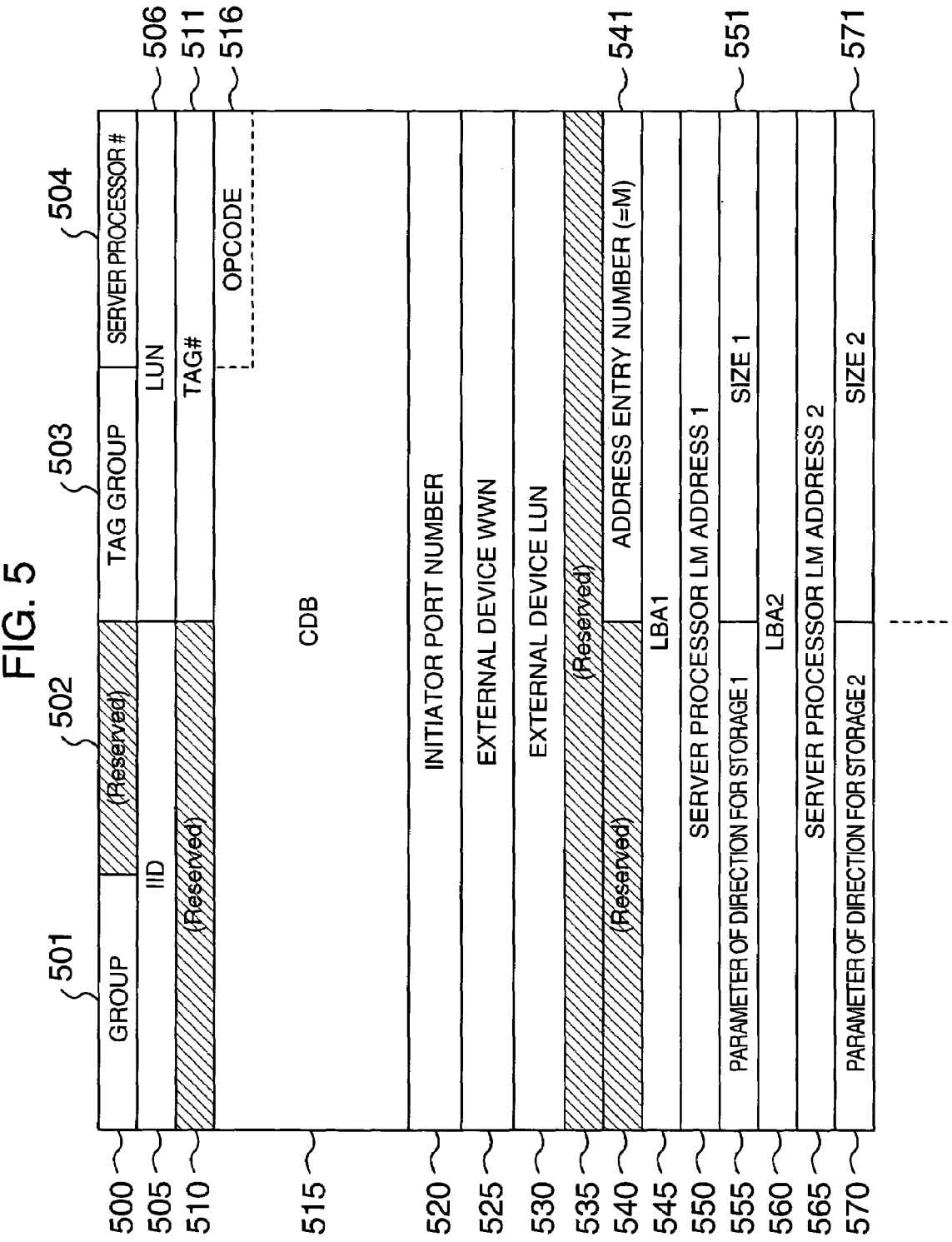
FIG. 5 is a diagram showing the format of a command data block according to the first embodiment.

FIG. 5 is a diagram showing the format of a command data block according to the first embodiment of the invention.

Referring to FIG. 5, reference numeral 500 represents a command data block to be transmitted from the file server unit 400 to the channel adapter unit 460. Reference numeral 501 represents a command type which distinguishes between a normal command and a special command. Reference numerals 502, 510, 535 and 540 represent a reserved field. Reference numeral 503 represents a TAG type which identifies a control method to be used when this command is stored in a queue. Reference numeral 504 represents a server processor # which identifies the server processor 210 issued this command. Reference numeral 505 represents an IID which distinguishes between an access to a user area and an access to a system area. Reference numeral 506 represents a LUN which is the number of a logical unit to be accessed by the server processor 210. Reference numeral 511 represents a TAG# which is an identification number in the queue. Reference numeral 515 represents a CDB in which a command in conformity with the format used by an ordinary SCSI is stored. Reference numeral 516 represents an operation code in CDB which code distinguishes a read command, a write command and the like. Reference numeral 520 represents an initiator port number which indicates a transmission source port when a command is transmitted to an external. Reference numeral 525 represents an external device WWN which is a transmission destination WWN when a command is transmitted to an external. Reference numeral 530 represents an external device LUN which is a transmission destination LUN when a command is transmitted to an external. Reference numeral 541 represents the number of address entries which indicates the number of following parameters to be supplied to the storage system 100. Reference numerals 545 and 560 represent LBA1 and LBA2 which are relative addresses in LU. Reference numerals 550 and 565 represent physical addresses in the local memory 410 of the server processor 210, at which addresses subject data is stored. Reference numerals 555 and 570 represent a storage system instruction parameter, in the field of which parameter information specific to the file server unit is stored to be supplied to the channel adapter unit. Reference numerals 551 and 571 represent a buffer size or a transfer data length of data corresponding to each parameter. An example of the storage system instruction parameter is a stay-and-resident data instruction in the disk cache 132. By using this instruction, it becomes possible to know the use frequency of user or application data and the like the storage system 100 cannot be known. The performance of the storage system 100 can therefore be improved. Description will be given in the following on how the above-described command data block is transferred among the server processor 210, control data controller 221, channel processor 220 and disk cache 132.

Figure 6:
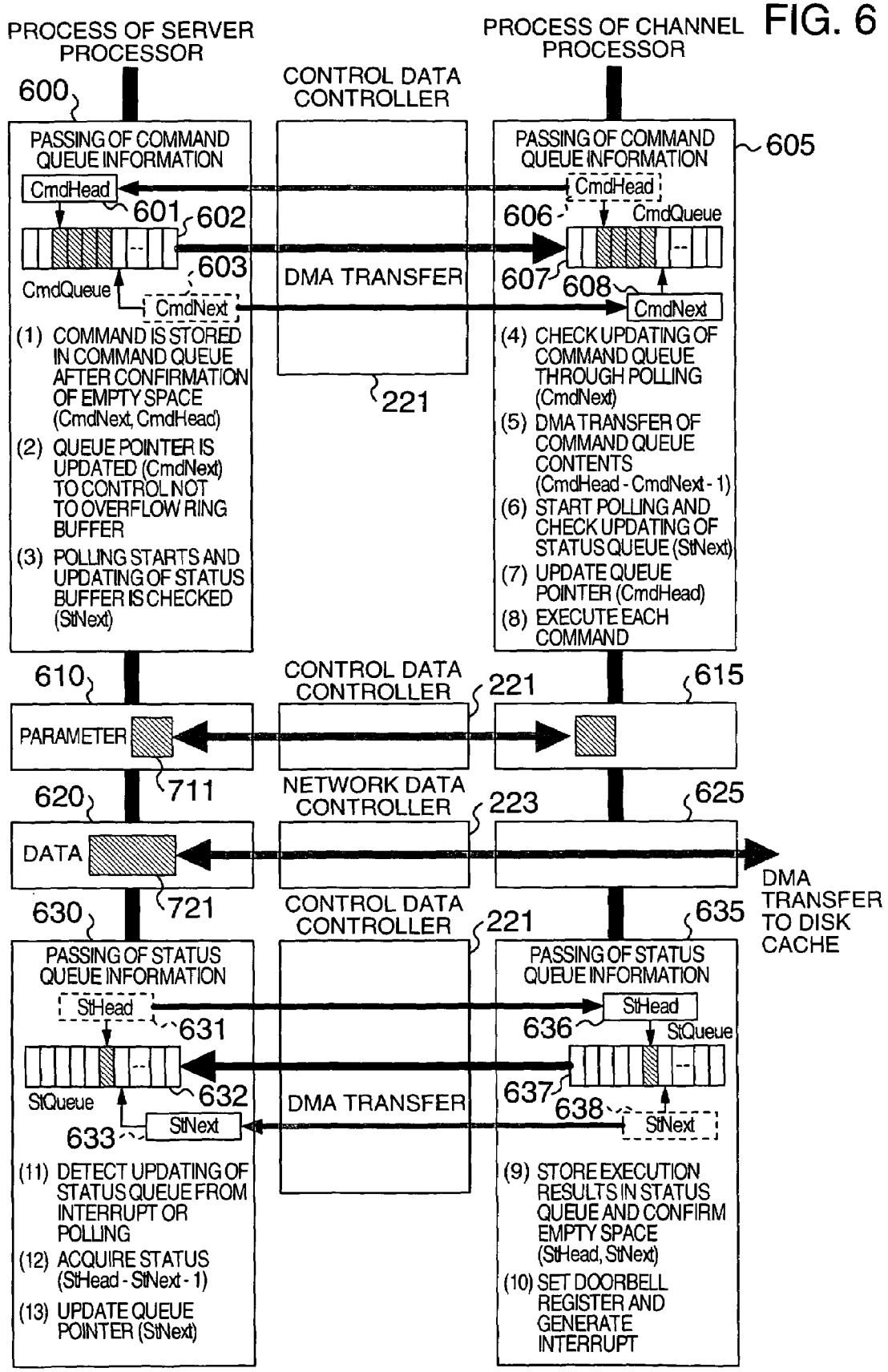
FIG. 6 is a flow chart illustrating a data access operation according to the first embodiment.

FIG. 6 is a flow chart illustrating a data access operation according to the first embodiment of the invention.

In order to efficiently process a command, the server processor 210 and channel processor 220 each have a command queue (CmdQueue) 602, 607, a pointer (Cmd-Head) 601, 606 indicating the head of the queue and a pointer (CmdNext) 603, 608 indicating a position at which the next incoming command is stored. The command queue 602, 607 is a ring buffer. In order to manage the status after the command process, the server processor 210 and channel processor 220 each have also a status queue (StQueue) 632, 637, a pointer (StHead) 631, 636 indicating the head of the queue and a pointer (StNext) 633, 638 indicating a position at which the next incoming command is stored. The status queue 632, 637 is also a ring buffer. During the transfer of a command or data, the server processor 210 and channel processor 220 confirm occasionally the contents of the command queues (CmdQueue) 602 and 607. In both the command queues, the contents of CmdHead 601 and 606 and CmdNext 603 and 608 are required to be coincident. To this end, CmdHead 606, CmdQueue 602 and CmdNext 603 are transferred to the server processor 210, channel processor 220 and channel processor 220, respectively to check the integrity of the contents. A similar process is also necessary for the status queues (StQueue) 632 and 637. The server processor 210 and channel processor 220 confirm occasionally the contents of the status queues (StQueue) 632 and 637. For the command and data process, a process 600 of the server processor 210 performs the following three steps.

(1) A command is stored in the command queue (Cmd-Queue) 602 after it is confirmed that there is an empty space in the command queue.
(2) A queue pointer is renewed and CmdNext 603 is checked so that the ring buffer will not overflow.
(3) Polling starts and the renewal of the status queue is checked.

In correspondence to this process, a process 605 of the channel processor 220 performs the following five steps.

(4) The renewal of the command queue (CmdQueue) 607 is checked through polling.
(5) The contents of the command queue (CmdQueue) 607 are received through DMA transfer.
(6) The renewal of the status queue (StQueue) 637 is checked through polling.
(7) The pointer (Cmdhead) 606 representative of the queue head is renewed.
(8) Each command is processed.

Next, in a process 610 of the server processor 210, a parameter 711 necessary for the command process is transferred to the channel processor 220 via the control data controller 221 through DMA transfer. At the same time, in a process 620 of the server processor 210, data is transferred to the disk cache 132 via the network data controller 223 through DMA transfer. The processes 610 and 620 can be executed in parallel because these processes can be executed using the independent paths shown in FIGS. 3 and 4. After the completion of the data transfer process, a process 635 of the channel processor 220 performs the following two steps.

(9) The execution result is stored in the status queue (StQueue) 637. It is confirmed that there is an empty space in the status queue.
(10) The door bell register 582 is set to generate an interrupt.

In correspondence to this process, a process 630 of the server processor 210 performs the following three steps.

(11) A renewal of the status queue (StQueue) 632 is detected from an interrupt or polling.
(12) A status is acquired.
(13) The queue pointer (StNext) 633 is renewed.

As illustrated in this flow chart, the command and status each can have a queue and can be processed using independent paths. The data access performance can therefore be improved.

Figure 7:
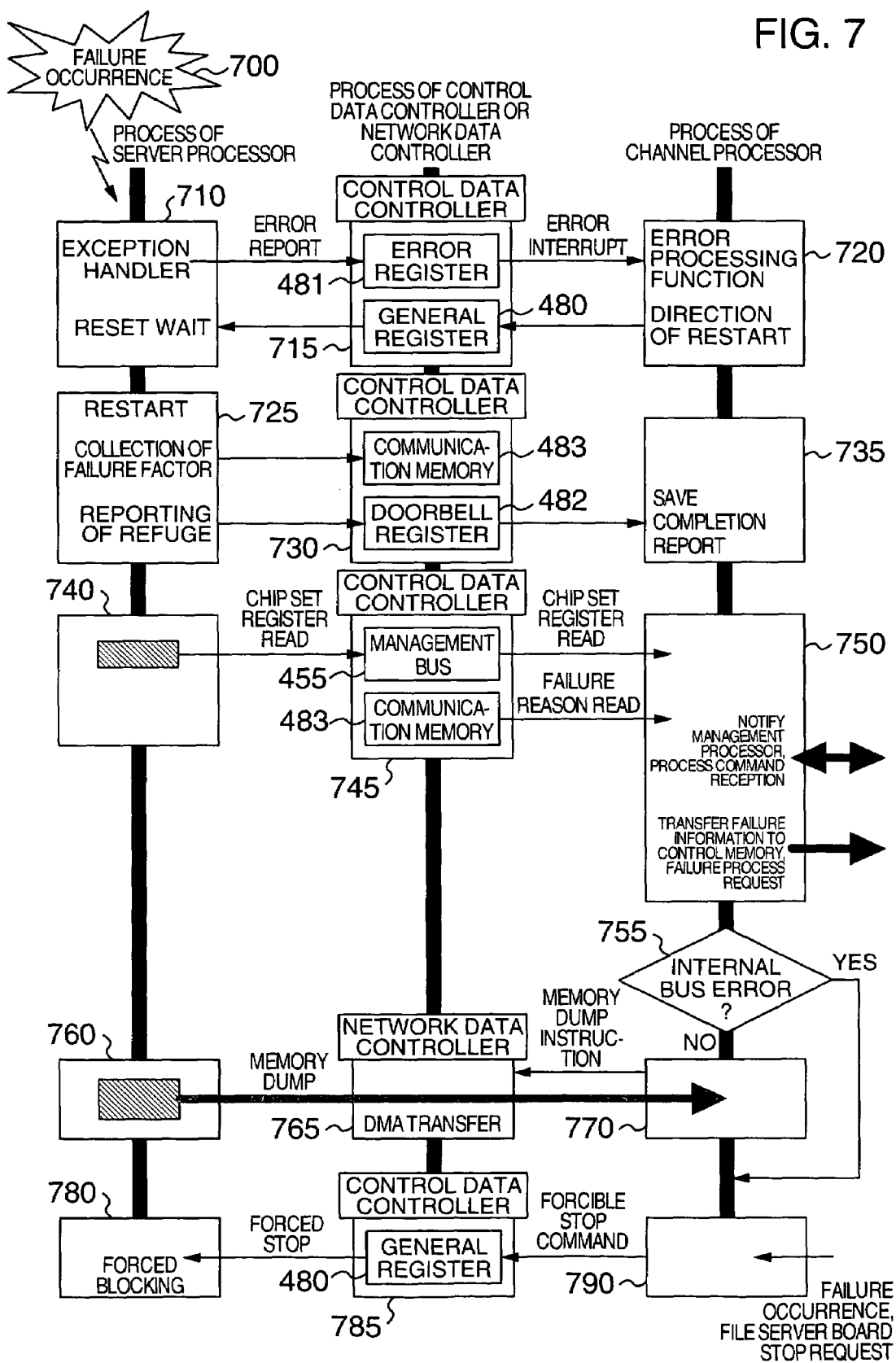
FIG. 7 is a flow chart illustrating an operation to be performed when a failure occurs in a server processor according to the first embodiment.

FIG. 7 is a flow chart illustrating an operation to be executed when a failure occurs in the server processor according to the first embodiment.

Referring to FIG. 7, a failure occurs at the server processor 210 at 700 so that an exception process is necessary. It cannot be expected that the internal buses 214 and 225 and internal bus controller 411 to and from which a command and data are usually transmitted and received, operate normally. In a process 710, the failure information is subjected to an operation by an exception handler. In a process 715, an error report is recorded in the error register 481 of the control data controller 221 in response to an interrupt signal. Thereafter, the server processor 210 waits for a reset command. Next, in the process 715 the control data controller 221 notifies the channel processor 220 of an occurrence of the failure at the server processor 210, by using an error interrupt. In a process 720, the channel processor 220 receives the error interrupt and activates an error process function. Thereafter, in the process 715 the channel processor 220 transmits a reset command to the general register 480 of the control data controller 221 in order to initialize the server processor 210. Next, the control data controller 221 transmits a reset in the form of an interrupt signal to the server processor 210. Upon reception of the reset, the process 710 of the server processor 210 instructs a next process 725 to be activated again. In the process 725, failure reasons of the server processor 210 are collected and in a process 730 stored in the communication memory 483 of the control data controller 221. Since the failure reasons are transferred via a normal path, the failure reasons are not guaranteed to have correct values. After this information is stored, the process 725 notifies a save completion report to the channel processor 220 via the door bell register 482. Thereafter, in order to acquire correct failure information, the channel processor 220 reads failure information via the management bus 455 in a process 750. More specifically, a chip set register is read. At the same time in a process 745, the failure reasons stored in the communication memory 483 of the control data controller 221 are read. After reading the information, the channel processor 220 notifies the information to the management processor 255 and receives a process command. Next, the failure information is transferred to the control memory 131 and a failure process request is issued to the other board. In a next process 755, it is checked whether there is an error at the internal buses 214 and 225. If there is no error, in a process 770 the channel processor 220 instructs the network data controller 223 to perform a memory dump. In a process 765 the network data controller 223 dumps the information and the like in the local memory 410 by DMA transfer. If there is an error at the internal buses 214 and 225, the memory dump is not performed. In response to an external failed file server board stop request, in a process 790 the channel processor 220 issues a forcible stop command to the control data controller 221. The control data controller 221 has a function of forcibly stopping the server processor 210 by using the power source control means 458. Upon reception of the forcible stop command, the server processor 210 is forcibly stopped. With the above processes, failure information can be transmitted to the channel processor 220 even if a failure occurs at the bus, because there is the path for transmitting the failure information, in addition to the ordinary bus. High reliability of the failure process can therefore be realized. The method of transmitting the failure information of a single file server board 112 has been described with reference to FIG. 7. A fail-over method among a plurality of file server boards 112 will be described below.

FIG. 8 is a flow chart illustrating a fail-over to be executed when a failure occurs at a server processor, according to the first embodiment of the invention. Similar to FIG. 7, a failure occurs at the server processor 210 at 700 so that an exception process is necessary. The channel processor 220 which detected a failure performs the process to be executed when a failure occurs at the server processor, in the manner described with reference to FIG. 7. During this process, failure information and a failure process request are written in the control memory 131. Thereafter, the file server board 115 at the fail-over destination detects the failure process in a process 810. The file server board 115 issues a stop request to the file server board 112 at the failure occurrence source. Thereafter, a wait state in a process 815 continues until a stop completion notice is received. Upon reception of a file server board stop request from the file server board 115, the file server board 112 stops the server processor in the manner described with reference to FIG. 7. In a process 820, the remaining I/O process is discarded, and thereafter a stop of the file server 112 is written in the control memory 131 to stop the channel processor. Upon reception of the stop of the file server board 112, the configuration information of the storage system 100 is renewed in the control memory 131 in a process 825. The stop is notified to the file server board 115 at the fail-over destination. Upon reception of the stop notice, the file server board 115 at the fail-over destination inherits a file server process in a process 830, and notifies the result to the management processor 255 to complete the fail-over.

In the SAN/NAS integrated storage system of the embodiment disclosed in the present invention, since the server processor 210 and channel processor 220 are each provided with the command queue (CmdQueue) 602, 607 and status queue (StQueue) 632, 637, the command process and status process can be executed asynchronously for the normal I/O process. Since the command and data can be processed by using the independent paths, the I/O process performance can be improved. Further, by using the independent paths for the command and data and by expanding commands, the I/O characteristics specific to the file server can be notified to the storage system. The storage system 100 can therefore be optimized, such as improving the hit rate of the disk cache 132. Since the file server unit and the channel adapter unit for the storage system are mounted on the same board and the storage system can be managed on the same management processor 255 and management display 260, an installation area can be reduced and a management cost can be reduced. In the failure process, failure information is transmitted via the management bus 455 and written in the control memory 131 shared by the storage system 100. The failure information can therefore be notified quickly to another file server board, irrespective of whether there is any bus failure. The efficiency of the fail-over can be improved and the reliability can be improved.

(Second Embodiment)

FIG. 9 is a flow chart illustrating a fail-over process to be executed when a failure occurs at the server processor, according to the second embodiment of the invention.

In the embodiment shown in FIG. 8, the file server 112 at the failure occurrence source autonomously notifies a failure occurrence to the file server board 115 at the fail-over destination. Depending upon the type of a failure, the failure occurrence cannot be notified and the failure process cannot start. In order to avoid such a case, the file server board 115 at the fail-over destination positively monitors the other file server board 112. In a normal state, the file server board 112 transmits a heart beat to the file server board 115 at the fail-over destination at a predetermined time interval. If a failure occurs in a process 900 and this heart beat is unable to be received in a predetermined time, the file server board 115 at the fail-over destination judges that a failure occurred and starts the failure process in a process 905. After the file server board 112 at the failure occurrence source writes the failure information in the control memory 131, the file server board 115 at the fail-over destination reads the configuration information from the control memory 131 to recognize the failure occurrence and confirm the failure process contents. Thereafter, in the process 905 the file server board 115 issues a stop request to the file server board 112 at the failure occurrence source. Similar to the process shown in FIG. 8, a wait state in a process 920 continues until a stop completion notice is received. Upon reception of the file server stop request from the file server board 115, the file server board 112 stops the server processor in the manner described with reference to FIG. 7. In a process 925, the remaining I/O process is discarded and thereafter a stop of the file server board 112 is written in the control memory 131 to stop the channel processor. Upon reception of the stop of the file server board 112, the configuration information of the storage system is renewed in the control memory 131 in a process 930 to notify the stop to the file server board 115 at the fail-over destination. Upon reception of the stop notice, the file server board 115 at the fail-over destination inherits the file server process in a process 935 and notifies the result to the management processor 255 to complete the fail-over.

In the SAN/NAS integrated storage system of the above-described embodiment disclosed by the present invention, even if a failure occurrence notice cannot be transmitted from the file server board 112 at the failure occurrence source, the file server board 115 at the fail-over destination can detect and confirm the failure occurrence at an earlier stage so that the efficiency of the fail-over can be improved and the reliability can be improved.

According to the invention, the I/O command and data can be transmitted and received independently between the file server unit and the disk control system so that the I/O process performance can be improved effectively. Since the disk control system can be provided with the I/O characteristics information of an application and a file system, the I/O process can be optimized effectively. Since the file server unit and the channel adapter unit of the disk control system are mounted on the same board and the disk control system can be managed by using the same management processor and management display, an installation area and a management cost can be reduced effectively. Since the failure information of the file server unit can be shared by using the independent route, an efficiency of the fail-over can be improved and a high reliability can be realized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer; and
wherein said controller having said file interface comprises:
a file server unit for communicating with the host computer;
a file system for converting a command and data at a file level received from the host computer into a command and data at a block level;
a channel adapter unit having an interface to said network; and
a disk adapter for controlling said disks.

2. A SAN/NAS integrated storage system comprising:
a plurality of disks for storing data;
a plurality of controllers for receiving an I/O command from a host computer and controlling said disks in accordance with the I/O command;
a network for interconnecting said plurality of controllers; and
a control memory connected to said network and shared by said plurality of controllers;
wherein one of said plurality of controllers has a block interface as an interface to the host computer; and another of said plurality of controllers has a file interface as an interface to the host computer.

3. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer; and
wherein said controller having said file interface comprises:
a file server unit for communicating with the host computer;
a file system for converting a command and data at a file level received from the host computer into a command and data at a block level; and
a channel adapter unit having an interface to said network,
respectively mounted on a single board.

4. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer; and
wherein said controller having said file interface comprises:
a file server unit for communicating with the host computer;
a file system for converting a command and data at a file level received from the host computer into a command and data at a block level;
a channel adapter unit for receiving the command and the data at the block level issued from said file system; and
a disk adapter for controlling said disks.

5. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer;
wherein said controller having said file interface comprises a plurality of communication paths between a file server unit for communicating with the host computer and a channel adapter unit for receiving an input/output command and input/output data at a block level; and
wherein the command and the data are transmitted and received via different paths.

6. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer;
wherein said controller having said file interface comprises a physical communication path between a file server unit for communicating with the host computer and a channel adapter unit for receiving an input/output command and input/output data at a block level; and
wherein said physical communication path is controlled as if a plurality of independent and virtual paths exist, and the command and the data are transmitted and received via different paths.

7. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer;
wherein said controller having said file interface comprises a physical communication path between a file server unit for communicating with the host computer and a channel adapter unit for receiving an input/output command and input/output data at a block level; and
wherein said physical communication path is controlled as if a plurality of independent and virtual paths exist, and by inserting information specific to a file system into a command, the command and the data are transmitted and received via different paths.

8. A SAN/NAS integrated storage system comprising:
a plurality of disks for storing data;
a plurality of controllers for receiving an I/O command from a host computer and controlling said disks in accordance with the I/O command; and
a network for interconnecting said plurality of controllers;
wherein one of said plurality of controllers has a block interface as an interface to the host computer; and another of said plurality of controllers has a file interface as an interface to the host computer;
wherein said controller having said file interface comprises a failure information communication path between a file server unit for communicating with the host computer and a channel adapter unit for receiving an input/output command and input/output data at a block level; and
wherein failure information is transmitted to a control memory independently from a communication path for a command and data.

* * * * *